United States Patent [19]

Takabatake

[11] Patent Number: 4,975,261
[45] Date of Patent: Dec. 4, 1990

[54] PROCESS FOR PRODUCING HIGH STRENGTH CARBON-CARBON COMPOSITE

[75] Inventor: Minoru Takabatake, Kamisumachi, Japan

[73] Assignee: Petoca Ltd., Tokyoto, Japan

[21] Appl. No.: 247,239

[22] Filed: Sep. 21, 1988

[30] Foreign Application Priority Data

| Sep. 22, 1987 [JP] | Japan | 62-238218 |
| Sep. 22, 1987 [JP] | Japan | 62-238219 |
| Sep. 22, 1987 [JP] | Japan | 62-238220 |

[51] Int. Cl.$^5$ .............................................. C01B 31/02
[52] U.S. Cl. ................................... 423/445; 423/449; 264/29.1; 264/29.5
[58] Field of Search ............... 423/445, 449; 264/29.1, 264/29.5

[56] References Cited

U.S. PATENT DOCUMENTS

| 2,799,052 | 7/1957 | Stroup | 264/29.1 |
| 3,283,040 | 11/1966 | Stover | 264/29.1 |
| 3,573,086 | 3/1971 | Lamdbin | 264/29.1 |
| 3,718,720 | 2/1973 | Lamdbin et al. | 264/29.1 |
| 3,814,642 | 6/1974 | Araki et al. | 423/449 |
| 3,936,535 | 2/1976 | Boder | 264/29.5 |
| 3,969,124 | 7/1976 | Stewart | 423/449 |
| 3,993,738 | 11/1976 | Overholser et al. | 423/445 |
| 4,041,116 | 8/1977 | Baud et al. | 264/29.5 |
| 4,225,569 | 9/1980 | Matsui et al. | 264/29.1 |

FOREIGN PATENT DOCUMENTS

| 59-107913 | 12/1982 | Japan . | |
| 59-69408 | 4/1984 | Japan | 423/449 |
| 59-184715 | 10/1984 | Japan | 264/29.1 |
| 61-231222 | 10/1986 | Japan | 264/29.1 |

*Primary Examiner*—Olik Chaudhuri
*Assistant Examiner*—Robert M. Kunemund
*Attorney, Agent, or Firm*—Armstrong, Nikaido, Marmelstein, Kubovcik & Murray

[57] ABSTRACT

A process for producing a high density, high strength carbon-carbon composite which does not require high cost secondary reinforcement treatment. This process comprises impregnating an aggregate such as a bundle of a carbon fiber with a liquid dispersion of a carbonaceous material of specified size of a fine powder or a short fiber of carbonaceous material to form a reinforcement material of a carbon fiber having the fine powder or the short fiber of a carbonaceous material distributed on the surface as well as in the inside of said bundle of a carbon fiber, and impregnating said aggregate of a carbon fiber with one or more liquid carbonaceous material selected from the group consisting of a phenolic resin, a furan resin and a pitch and carbonizing the impregnated bundle of a carbon fiber, and if necessary, graphitizing the carbonized product.

18 Claims, No Drawings

PROCESS FOR PRODUCING HIGH STRENGTH CARBON-CARBON COMPOSITE

BACKGROUND OF THE INVENTION 1. (Field of the Invention)

This invention relates to a process for producing a carbon fiber reinforced carbon composite, in which an aggregate such as a bundle of a carbon fiber is immersed in a liquid carbonizable material, and carbonized under inert atmosphere, and if necessary, the carbonized materials are graphitized. More particularly it relates to a process for producing a high density, high strength carbon-carbon composite superior in strength, heat resistance, chemical resistance, abrasion resistance, etc. and containing almost no crack, detachment, etc.

The carbon-carbon composites produced according to the process of the present invention are useful in parts of machines, parts of electric and electronic instruments, etc.

2. (Prior Art)

It has been known that high density, high strength carbon-carbon composites can be obtained by impregnating a high strength, high modulus carbon fiber, as a reinforcement material, with a liquid carbonizable material while they are being wound into a desired shapes, or by impregnating a structure having a high strength, high modulus carbon fiber, as its principal material, e.g. woven fabrics, three dimensional woven fabrics, nonwoven fabrics, unidirectionally arranged sheets, etc. with a liquid carbonizable material, carbonizing a precursor of carbon namely the liquid carbonizable material used as a matrix, in an inert atmosphere, and if necessary, further graphitizing the carbonized material.

The problems of this process are insufficiency of adhesivity between the reinforcement material and matrix carbon of the produced composite at the boundary surface thereof and generation of many cracks and detachment and reduction of mechanical strength of the composite material caused by the above-mentioned defects. Various attempts have been made to increase the adhesivity, but since there are such great temperature changes during the process of carbonization that are unbelievable in case of production of other composite materials, and since it is considered that extremely anisotropic property of crystal of carbon molecule is attributed to substantial difference in dimensional changes between the reinforcement material and the matrix, a considerably high interfacial adhesivity is required.

In order to solve the above-mentioned problems, high density, high strength carbon-carbon composite materials have been made by reimpregnating a carbonized composite material with a liquid carbonizable material and subsequently subjecting the reimpregnated material to carbonization, and repeating impregnation and carbonization steps 5 to 6 times or more to fill cracks and detached parts to attain reinforcement.

This process is a good process for producing high density high strength carbon-carbon composite materials having excellent characteristic properties, but has a drawback in that production process takes long and production cost is high because of long residence time of the carbonization step which requires a large energy consumption.

Particularly, in economical viewpoint, in case of the use of pitch as a precursor of matrix carbon, it is known that carbonization is carried out under a higher pressure in order to increase carbon yield and suppression of generation of large pores. Thus, effective impregnation and carbonization and curtailment of processing time can be possible. However, as known from the observation with a polarizing microscope, carbonized product obtained from pitch in the early stage of carbonization is a product of coarse texture having a flow pattern. It is apt to produce cracks at the time of carbonization and its strength is weak.

Even when such a shaped article is subjected to carbonization and graphitization treatment at a further higher temperature, it is difficult to expect improvement in quality of resulting products. Also, resulting products is not satisfactory as industrial material. Thus, a secondary reinforcement treatment of repetition of impregnation and carbonization becomes necessary. Thus, there is also a problem in that cost of product is high compared with the raw material cost.

Various processes have been known for reinforcing interfacial adhesivity between a reinforcement material and a matrix in carbon-carbon composite materials, but most of them are those in which surfaces of a carbon fiber are modified with a treating agent. However, a burnt modifying component introduces impurities in a carbon-carbon composite material, and as the result, there is also a problem that reduction of other qualities , e.g., reduction of chemical resistance and heat resistance occurs frequently.

In order to reinforce the interfacial adhesivity between a reinforcement material and a matrix, use of a material which is the same with the raw material of the carbon fiber of the reinforcement material, for a liquid carbonizable material as a precursor of matrix carbon is disclosed in Japanese laid open (Kokai) patent application No. 52912 of 1977. However, there is a problem that not a few cases are practically ineffective, because orientation and crystallizability of carbon molecule varies considerably according to the condition of carbonization process, and because volume change of a liquid carbonizable material at the time of carbonization is remarkably greater compared with the volume change due to the progress of crystallization of the carbon fiber.

In order to solve the above-mentioned problems, Japanese laid open (Kokai) patent application No. 209883 of 1982 discloses mixing of carbonaceous fine particles or fine particles of solid carbonaceous material into a liquid carbonizable material, as a precursor of matrix carbon. A problem of this process is difficulty of increasing mixing ratio of fine particles, because the viscosity of the liquid carbonizable material is notably increased by incorporation of fine particles, and it is difficult for the liquid carbonizable material to impregnate into an aggregate of the carbon fiber of the reinforcement material.

In Japanese laid open (Kokai) patent application No. 161144 of 1985, there is disclosed a process in which a mixed material of graphite fine powder and a carbon fiber is impregnated with a thermosetting resin, and resulting product is laminated, pressure-molded, cured and then carbonized. The problem of this process is difficulty of mixing of graphite fine powder and a carbon fiber and difficulty of shaping except those in which the carbon fiber is oriented unidirectionally. This problem can be solved by preliminarily mixing and dispersing graphite fine powder with a thermosetting resin, but deterioration of electrical properties is notable.

It is an object of the present invention to overcome the problem of loss of mechanical strength of composite material due to formation of a large number of cracks and detachment caused by insufficiency of adhesivity on the interfacial surface of a reinforcement material and a matrix at the time of shaping and carbonization of carboncarbon composite materials, and the problem of increase of production cost inevitably brought about by the necessity of removing cracks and detachment by impregnating the precursor of matrix carbon a number of times.

The above-mentioned object can be attained according to a process of the present invention.

SUMMARY OF THE INVENTION

The present invention resides in a process for producing a carbon-carbon composite which comprises immersing an aggregate such as a bundle of a carbon fiber in a liquid dispersion prepared by dispersing in a liquid a carbonaceous material selected from the group consisting of (i) carbonaceous fine powder having an average particle diameter of 12–0.07 micron such as secondary particles of graphite, carbon, carbon black or the like or (ii) a carbonaceous short fiber which is cut or ground into fiber length of 2 mm or less such as an infusiblized pitch fiber or a pitch-based carbon fiber having been carbonized at a temperature of 2200° C. or lower, to obtain a reinforcement material of a carbon fiber wherein said carbonaceous material (i) or (ii) is distributed substantially on the surface and in the inside of said aggregate of a carbon fiber, and immersing the resulting reinforcement material of a carbon fiber, in one or more liquid carbonizable material selected from the group consisting of a thermosetting resin such as phenolic resin, furan resin or the like and a pitch and carbonizing the resulting impregnated reinforcement material of a carbon fiber and if necessary graphitizing the resulting carbonized product.

In another aspect, the present invention resides in a process for producing a carbon-carbon composite which comprises immersing an aggregate such as a bundle of a carbon fiber into a dispersion in a liquid medium of a carbonaceous fine powder having an average particle size of 12–0.07 micron, such as graphite, carbon, secondary particle of carbon black or the like to give a reinforcement material of the carbon fiber in which the fine powder of the carbonaceous material is substantially distributed on the surface and in the inside of the aggregate of the carbon fiber, impregnating said reinforcement material of the carbon fiber with a pitch, carbonizing the impregnated material under inert atmosphere at substantially atmospheric pressure, and if necessary, graphitizing the resultant carbonized product.

In the conventional shaping of carbon-carbon composite in which pitch is used as a precursor of matrix carbon, the formation of pores was notable in the treatment carried out at about 400–600° C., the early stage of carbonization step. But according to the process of the present invention, carbonization has become possible under the atmospheric pressure because the formation of pores has been greatly reduced.

In conventional methods for producing carbon shaped article in which pitch is used as a matrix carbon precursor, an aggregate of a fiber is impregnated with pitch under pressurized state and then carbonization was carried out under a pressurized atmosphere of an inert gas, to suppress the escape of volatile materials generated at the time of pyrolysis of pitch to the outside of the system to increase carbon yield. Also, bubbling was made gentler to suppress the generation of large pores. Also, high pressure impregnation and carbonization were repeated in order to reduce cracks and detachment. On this account, products were expensive. The process of the present invention has overcome the above-mentioned problems.

Fine powder of a carbonaceous material used in the present invention is preferably in the range of 5 to 0.1 micron in size. When particle size in this range is used, optical micro structure of matrix carbon is smaller and so-called fine mosaic structure is formed. On this account, products do not indicate brittle failure, and high strength products can be obtained. When the average particle diameter of fine powder is too large, segregation of particles occurs during the process of immersion of the aggregate into a liquid dispersion, and the whole system becomes heterogeneous before impregnation of the matrix, and brings about a problem that the strength of products does not increase. When the average particle diameter of fine powder is too small, adhesivity acting between particles becomes larger, and agglomerates of particles form network structure and cause a tendency to prevent impregnation of matrix.

This brings about a problem that immersion only once does not produce a sufficient strength. Further, at this time, the optical micro structure of matrix carbon show tendency of turning to isotropic state and even when resulting product is turned to high density state, it becomes a brittle material.

It is preferable that the viscosity of a liquid dispersion of fine powder of carbonaceous material is in the range of 30–0.1 poise.

As a dispersing medium, a solution of a prepolymer of a phenolic resin or a furan resin, a solution of a cellulose derivative, such as ethylcellulose or the like is preferred. It is also preferred that a liquid dispersion of carbonaceous material is the one in which an aqueous solution containing a dissolved aqueous surfactant is used as a dispersing medium.

The short fiber of carbonaceous material used in the present invention have preferably a length of 1.2 mm or shorter and 12 micron or longer. When the short fiber is too long, it is apt to form entanglement. Also, not only the resulting liquid dispersion is unstable, but also, the short fiber gathers on the surface of an aggregate of the carbon fiber during the process of impregnation of the liquid dispersion and does not penetrate into the inside. This causes a problem that immersion carried out only once does not produce a sufficient strength. Usually, the short fiber of carbonaceous material has a fiber diameter of 2 to 20 microns, and preferably 3 to 16 microns.

The carbonaceous short fiber can be produced by cutting a carbonaceous fiber with a cutter and also by grinding with a grinder. When production is carried out with a grinder, it is also possible to produce a fiber having extremely short fiber length. However, when the short fiber has a fiber length of less than 12 micron, the fiber shape is apt to be destroyed and cutting and grinding of the fiber become difficult. Even when such a short fiber is prepared, it is not preferable because the fiber shape is not practically maintained.

There is a preferable degree of carbonization for cutting and grinding. In case of pitch-based carbon fibers, a carbonization temperature around 1000° C. is most preferred. When carbonization temperature is too low, a fiber is apt to form ball like agglomerates and when it is too high, a fiber breaks easily.

It is preferred that the dispersion of the carbonaceous short fiber has a viscosity of 30 to 0.1 poise. The dispersing medium is preferably a prepolymer of a phenolic resin or a furan resin or a solution of a cellulose derivative such as ethyl cellulose. It is also preferred that the dispersion of the carbonaceous short fiber is one wherein an aqueous solution dissolving a water soluble surfactant is used as a dispersing medium.

The concentration of carbonaceous material in a liquid dispersion of fine powder of carbonaceous material is preferably in the range of 18–0.6 % by weight.

A liquid dispersion of carbonaceous material impregnated into an aggregate of a carbon fiber is freed of a dispersing medium by heat treatment and drying, and carbonaceous material is fixed on the surface and in the inside of the aggregate of a carbon fiber.

An aggregate of a carbon fiber having carbonaceous material fixed on the surface as well as in the inside is impregnated with one or more liquid carbonizable material selected from the group consisting of a thermosetting resin such as a phenolic resin, a furan resin or the like and a pitch and then carbonized and, if necessary, graphitized.

To impregnate a liquid carbonizable material, an aggregate of a carbon fiber is preliminarily arranged or wound up to form a desired shape before impregnation, and it is subjected to the steps of reduced pressure and then pressurized atmosphere, once, twice or more to substantially remove pores and, if necessary, subjected to pressshaping. Then it is carbonized under inert atmosphere or pressurized inert atmosphere.

In order to improve heat-resistance and chemical resistance sufficiently, it is preferable to carry out carbonization and graphitization at a temperature higher than 1000° C.

The carbon fiber, a material for carbon-carbon composite of the present invention, may be of any type. However, those which show small difference of dimensional change relative to a precursor of matrix carbon during carbonization and graphitization are preferred. Pitch-based carbon fibers, particularly optically anisotropic pitch-based carbon fibers are preferable to carbon fibers made from a PAN based synthetic fiber or the like.

EXAMPLE 1

(Impregnation with a dispersion of graphite powder)

A petroleum pitch based carbon fiber carbonized at 800° C. were drawn unidirectionally and immersed in a liquid dispersion of graphite powder having an average particle diameter of 2 micron. The liquid dispersion was made by using a novolak having a solid portion of 12 % as a dispersing medium and adding 10 % by weight of graphite powder to this. It had a viscosity of 9.5 poise.

The bundle of a carbon fiber after impregnation is subjected to heat treatment at 175° C. for 30 minutes to remove water and the novolak is turned to a phenolic resin. Solid matter caused to adhere to the bundle of a carbon fiber was 22 % relative to the weight of the carbon fiber.

This bundle of a carbon fiber was impregnated with a molten petroleum pitch (having a softening point of 150° C., a residual carbon of 53 % by weight and a density of 1.28 g/cm$^3$) under a reduced pressure of 2.5 Torr followed by subsequently after substitution by argon gas, and pressure was elevated up to 1 MPa to carry out impregnation in a pressurized state.

Resulting sample was carbonized after heat treating up to 600° C. under the pressurized atmosphere of argon gas (15 MPa) at a heating rate of 2.5° C. per minute, and the sample was maintained at 600° C. for 2 hours. Further, carbonization was continued up to 2000° C. at a heating rate of 10° C. per minute under the atmosphere of argon gas at atmospheric pressure, and then carbonization was carried out at a temperature of 2000° C. for 20 minutes.

The characteristic properties of the resulting carbon-carbon composite were as follows:

| | |
|---|---|
| volume ratio of carbon fiber | 55% |
| Bulk density | 2.03 g/cm$^3$ |
| Flexural strength | 545 MPa |
| Flexural modulus of elasticity | 210 GPa |

After impregnation of graphite powder free novolak in place of impregnation solution of example 1 containing a dispersion of graphite powder, impregnation of a petroleum pitch was carried out as in example 1. By the treatment of impregnation under a reduced pressure and impregnation under a pressurized state carried out one time, a large amount of cracks and detachment occurred in the inside of carbonized products. Also, bulk density was notably smaller and flexural strength and flexural modulus of elasticity are inferior compared with the result of example 1.

EXAMPLE 2

By changing an average particle diameter of graphite fine powder, and using a prepolymer of phenolic resin as a dispersing medium, a dispersion of graphite powder was prepared and caused to impregnate into bundles of a carbon fiber as in example 1. After curing treatment, petroleum pitch was caused to impregnate therein and carbonization treatment was carried out. Particle diameters, viscosities of impregnation liquid and characteristic properties of resulting carbon-carbon composites are shown in Table 1.

TABLE 1

| | Diameter of graphite particles and characteristic properties of carbon—carbon composite | | | | |
|---|---|---|---|---|---|
| Experiment number | Diameter of graphite particles m | Viscosity of dispersion liquid of graphite powder poise | Characteristic properties of carbon—carbon composite | | |
| | | | Bulk density g/cm$^3$ | Flexural strength MPa | Flexural modulus of elasticity GPa |
| 1(comparative example) | 15 | 9.5 | 1.76 | 315 | 190 |
| 2 | 11 | 8.6 | 1.83 | 495 | 210 |
| 3 | 5 | 7.2 | 1.89 | 515 | 210 |
| 4 | 0.9 | 10.3 | 1.95 | 520 | 210 |
| 5 | 0.3 | 5.2 | 2.06 | 565 | 210 |
| 6 | 0.1 | 6.9 | 1.98 | 535 | 210 |
| 7 | 0.9 | 0.2 | 1.93 | 490 | 200 |
| 8 (comparative example) | 0.06 | 6.2 | 1.73 | 380 | 195 |
| 9 (comparative example) | 0.9 | 35.5 | 1.70 | 310 | 190 |
| 10 (comparative | 0.9 | 0.06 | 1.86 | 375 | 195 |

TABLE 1-continued

Diameter of graphite particles and characteristic properties of carbon—carbon composite

| Experiment number | Diameter of graphite particles m | Viscosity of dispersion liquid of graphite powder poise | Characteristic properties of carbon—carbon composite | | |
|---|---|---|---|---|---|
| | | | Bulk density g/cm³ | Flexural strength MPa | Flexural modulus of elasticity GPa |
| example) | | | | | |

EXAMPLE 3

A bundle of carbon fiber impregnated with the liquid dispersion of graphite fine powder of example 1 and cured, were impregnated with a phenolic resin, and a furan resin, respectively, and subjected to carbonization treatment. The resulting carbon-carbon composite contained almost no cracks and detachment as in example 1.

EXAMPLE 4

(Carbonization under atmospheric pressure)

A petroleum-pitch based carbon fiber carbonized at 800° C. were drawn to give unidirectional arrangement and impregnated with a liquid dispersion of graphite fine powder having an average particle diameter of 2 micron. The liquid dispersion which was prepared by using, as a dispersing medium, a novolak having a solid matter proportion of 12 % by weight and adding 10 % by weight of graphite powder thereto, had a viscosity of 9.5 poise.

The impregnated bundle of a carbon fiber was heat treated at a temperature of 175° C. for 30 minutes to remove water and to turn novolak to phenol resin. The solid matter adhered to the bundle of the carbon fiber at this time was 22 % based on the weight of the carbon fiber.

The resulting bundle of the carbon fiber was impregnated with melted petroleum pitch (having a softening point of 150° C., a residual carbon of 53 % by weight and a density of 1.28 g/cm³) under a reduced pressure of 2.5 Torr. After substitution with argon gas, pressurized impregnation was carried out by elevating a pressure up to 1 MPa.

Carbonization of the resulting sample was carried out while temperature was elevated up to 600° C. at a heating rate of 10° C. per hour under argon gas atmosphere at atmospheric pressure and maintaining the temperature at 600° C. for 2 hours. Further carbonization was carried out under argon gas atmosphere at atmospheric pressure while elevating the temperature up to 2000° C. at a heating rate of 10° C. per minute and maintaining the temperature at 2000° C. for 20 minutes.

There were no swelling and deformation in the resulting carbon-carbon composite. The characteristic properties of these samples were as follows:

| volume ratio of carbon fiber | 56% |
|---|---|
| Bulk density | 1.82 g/cm³ |
| Flexural strength | 410 MPa |
| Flexural modulus of elasticity | 210 GPa |

COMPARATIVE EXAMPLE 2

After impregnation of graphite powder free novolak in place of the impregnating liquid of example 4 which contains dispersion of graphite powder, impregnation with a petroleum pitch was carried out as in example 4. By one time treatment of impregnation under a reduced pressure and then impregnation in a pressurized state, swelling and deformation resulted in carbonized shaped articles. A large amount of cracks and detachment occurred in the inside thereof. Compared with the products of example 4, bulk density was notably smaller and flexural strength and flexural modulus of elasticity were also inferior.

EXAMPLE 5

By changing the average particle diameter of graphite fine powder, and using a prepolymer of phenolic resin as a dispersing medium, a liquid dispersion of graphite powder was prepared. After bundles of a carbon fiber were impregnated with the dispersion liquid, as in example 4, and subjected to curing treatment, they were impregnated with a petroleum pitch and subjected to carbonization treatment. Diameters of graphite particles, viscosities of liquid dispersion and characteristic properties of the resulting carbon-carbon composites are shown in Table 2.

TABLE 2

Diameter of graphite particles and characteristic properties of carbon-carbon composite

| Experiment number | Diameter of graphite particle m | Viscosity of dispersion liquid of graphite powder poise | Characteristic properties of carbon-carbon composite | | |
|---|---|---|---|---|---|
| | | | Bulk density g/cm³ | Bending strength MPa | Bending modulus of elasticity GPa |
| 1(comparative example) | 15 | 9.5 | 1.53 | 260 | 170 |
| 2 | 11 | 8.6 | 1.72 | 400 | 205 |
| 3 | 5 | 7.2 | 1.78 | 405 | 205 |
| 4 | 0.9 | 1.3 | 1.83 | 415 | 210 |
| 5 | 0.3 | 5.2 | 1.86 | 450 | 210 |
| 6 | 0.1 | 6.9 | 1.88 | 430 | 205 |
| 7 | 0.9 | 0.2 | 1.81 | 400 | 205 |
| 8 (comparative example) | 0.06 | 6.2 | 1.68 | 315 | 180 |
| 9 (comparative example) | 0.9 | 35.5 | 1.63 | 275 | 170 |
| 10 (comparative example) | 0.9 | 0.06 | 1.74 | 300 | 180 |

EXAMPLE 6

(Impregnation with a liquid dispersion of a short fiber of a carbon fiber)

A petroleum pitch-based carbon fiber having been carbonized at 1400° C. were drawn unidirectionally and impregnated with a liquid dispersion of a petroleum-pitch-based carbon fiber having an average fiber length of 1.2 mm and average diameter of 8 micron. The liquid dispersion was prepared by using novolak having a solid matter of 12 % by weight as a dispersing medium and adding 10 % by weight of a short fiber of a carbon fiber. This liquid dispersion had a viscosity of 9.5 poise.

The bundle of a carbon fiber after impregnation was heat treated at a temperature of 175° C. for 30 minutes to remove water and convert novolak to phenol resin. The matter caused to adhere to the bundle of the carbon fiber was 22 % by weight relative to the weight of the carbon fiber.

The resulting bundle of the carbon fiber was impregnated with melted petroleum pitch (having a softening point of 150° C., a residual carbon of 53 % by weight and a density of 1.28 g/cm³) under a reduced pressure of 2.5 Torr, followed by substitution with argon gas, and impregnation was carried out in a pressurized state by elevating the pressure up to 1 MPa.

Carbonization was carried out while elevating the temperature up to 600° C. at a heating rate of 2.5° C. per minute under pressurized atmosphere of argon gas and maintaining at 600 ° C. for 2 hours. Further, carbonization was continued up to 2000° C. at a heating rate of 10° C. per minute under argon gas atmosphere at an atmospheric pressure, and while maintaining the temperature of 2000° C. for 20 minutes.

The characteristic properties of the carbon-carbon composite material were as follows:

| | |
|---|---|
| Volume ratio of carbon fiber | 55% |
| Bulk density | 1.92 g/cm³ |
| Flexural strength | 550 MPa |
| Flexural modulus of elasticity | 220 GPa |

COMPARATIVE EXAMPLE 3

Impregnation with petroleum pitch was carried out in Example 6 after impregnation with novolak containing no short fiber of a carbon fiber in place of the impregnation liquid containing a liquid dispersion of the short fiber of the carbon fiber of Example 6. With only one time treatment of impregnation under a reduced pressure and impregnation in a pressurized state, a large amount of cracks and detachment occurred in the inside of carbonized products. Compared with the products of Example 6, bulk density was notably smaller and flexural strength and flexural modulus of elasticity were also inferior. Example 7.

Using a prepolymer of phenolic resin as dispersing medium, impregnation liquids wherein cut length of a carbon fiber is changed were prepared. A bundles of a carbon fiber was impregnated with one of the dispersions and subjected to curing treatment as in Example 6. Then it was impregnated with a petroleum pitch and carbonization treatment was carried out in the same manner. Cut length of the carbon fiber, viscosity of impregnating liquid and properties of the resulting carbon-carbon composites are shown in Table 3. Incidentally, fibers not longer than cut length of 0.5 mm were milled fibers.

TABLE 3

| | Cut length of carbon fiber and properties of carbon-carbon composite | | | | |
|---|---|---|---|---|---|
| | | Viscosity of | Characteristic properties of carbon-carbon composite | | |
| Experiment number | Cut length mm | dispersion liquid of carbon fiber poise | Bulk Density g/cm³ | Bending strength MPa | Bending modulus of elasticity GPa |
| 1(comparative example) | 5 | 8.2 | 1.74 | 390 | 190 |
| 2 | 0.7 | 9.7 | 1.87 | 515 | 210 |
| 3 | 0.5 | 6.2 | 1.94 | 525 | 210 |
| 4 | 0.5 | 1.5 | 1.92 | 505 | 210 |
| 5 | 0.5 | 0.2 | 1.91 | 500 | 210 |
| 6 | 0.15 | 11.5 | 1.98 | 540 | 220 |
| 7 | 0.06 | 5.3 | 2.00 | 585 | 220 |
| 8 (comparative example) | 1.2 | 36.3 | 1.80 | 415 | 210 |
| 9 (comparative example) | 1.2 | 0.08 | 1.78 | 385 | 205 |

EXAMPLE 8

A bundle of a carbon fiber was impregnated with the liquid dispersion of the short carbon fiber of Example 6 and curing was carried out. The resulting cured product was impregnated with a phenolic resin and a furan resin and carbonization treatment was carried out. Resulting carbon-carbon composites contained almost no cracks and detachment as in Example 6.

EFFECTIVENESS OF THE INVENTION

According to the process of the present invention, it is possible to produce a high density and high strength carbon-carbon composite without carrying out high cost secondary reinforcement treatment such as re-impregnation, etc.

What is claimed is:

1. A process for producing a carbon-carbon composite which comprises impregnating an aggregate of a carbon fiber with a liquid dispersion of a carbonaceous material selected from the group consisting of
   (i) a carbonaceous fine powder material having an average particle diameter of 12–0.07 micron and
   (ii) a carbonaceous short fiber cut or ground to a fiber length not longer than 2 mm,
to form a reinforcement material of a carbon fiber having about 22% of fine powder or short fiber of the carbonaceous material distributed substantially on the surface and in the inside of said aggregate of a carbon fiber, impregnating said reinforcement material of a carbon fiber with one or more of liquid carbonizable material selected from the group consisting of a thermosetting phenolic resin and furan resin, and a pitch, and carbonizing the impregnated reinforcement material of a carbon fiber.

2. A process for producing a carbon-carbon composite which comprises impregnating an aggregate of a carbon fiber with a liquid dispersion of a carbonaceous material selected from the group consisting of
   (i) fine powder of a carbonaceous material having an average particle diameter of 12–0.07 micron and
   (ii) a carbonaceous short fiber cut or ground to a fiber length not longer than 2 mm to form a reinforcement material of a carbon fiber having about 22% of fine powder or short fiber of the carbonaceous material distributed substantially on the surface as well as in the inside of the said aggregate of a carbon fiber, impregnating said reinforcement material of a carbon fiber with one or more of liquid carbonizable material selected from the group consisting of a thermosetting phenolic resin and furan resin and a pitch, carbonizing the impregnated reinforcement material of a carbon fiber, and graphitizing the carbonized reinforcement material of a carbon fiber.

3. A process according to the claim 1 or 2 in which the said fine powder of carbonaceous material is graphite.

4. A process according to the claim 1 or 2 in which the said fine powder of carbonaceous material is carbon powder.

5. A process according to the claim 1 or 2 in which the said fine powder of carbonaceous material is carbon black.

6. A process according to the claim 1 or 2 in which the said short fiber is a pitch fiber having been subjected to infusiblization treatment.

7. A process according to the claim 1 or 2 in which said short fiber is a pitch-based carbon fiber carbonized at a temperature not higher than 2200° C.

8. A process according to the claim 1 or 2 in which carbonization is carried out under pressurized state.

9. A process according to claim 1 or 2 in which said aggregate is a bundle.

10. A process for producing a carbon-carbon composite which comprises impregnating an aggregate of a carbon fiber with a liquid dispersion of a carbonaceous material selected from the group consisting of
  (i) carbonaceous fine powder material having an average particle diameter of 12–0.07 micron and
  (ii) a carbonaceous short fiber cut or ground to a fiber length not longer than 2 mm,
to form a reinforcement material of a carbon fiber having about 22% of fine powder or short fiber of carbonaceous material distributed substantially on the surface and in the inside of said aggregate of a carbon fiber, impregnating said reinforcement material of a carbon fiber with a pitch, and carbonizing the impregnated reinforcement material of a carbon fiber under inert atmosphere at substantially atmospheric pressure.

11. A process for producing a carbon-carbon composite which comprises impregnating a aggregate of a carbon fiber with a liquid dispersion of a carbonaceous material selected from the group consisting of
  (i) carbonaceous fine powder material having an average particle diameter of 12–0.07 micron and
  (ii) a carbonaceous short fiber cut or ground to a fiber length not longer than 2 mm,
to form a reinforcement material of a carbon fiber having about 22% of fine powder or short fiber of carbonaceous material distributed substantially on the surface and in the inside of said aggregate of a carbon fiber, impregnating said reinforcement material of a carbon fiber with a pitch, and carbonizing the impregnated reinforcement material of a carbon fiber under inert atmosphere at substantially atmospheric pressure, and graphitizing the carbonized product.

12. A process according to the claim 10 or 11 in which the said fine powder of carbonaceous material is carbon powder.

13. A process according to the claim 10 or 11 in which said fine powder of carbonaceous material is carbon black.

14. A process according to the claim 10 or 11 in which said short fiber is a pitch fiber having been subjected to infusiblization treatment.

15. A process according to the claim 10 or 11 in which said short fiber is a pitch-based carbon fiber carbonized at a temperature not higher than 2200° C.

16. A process according to claim 10 or 11 in which said aggregate is a bundle.

17. A process according to the claim 10 or 11 in which said fine powder of carbonaceous material is graphite.

18. A carbon-carbon composite comprising a reinforcement material of a carbon fiber containing about 22% of 9, a matrix of a carbonized material filling the interstices formed between said reinforcement carbon fiber and bonded to said reinforcement material, and a fine carbonaceous material selected from the group consisting of fine powder of a carbonaceous material of graphite, carbon or carbon black having an average particle diameter of 12 to 0.07 micron, and a carbonaceous short fiber of an infusiblized pitch fiber or a pitch based carbon fiber carbonized 2200 ° C. or lower, said carbonaceous short fiber being cut or ground to a fiber length of 2 mm or shorter, said fine carbonaceous material distributed substantially evenly on the surfaces of said reinforcement carbon fiber, said matrix being a carbonized material from a thermosetting phenolic resin or a furan resin or a pitch.

* * * * *